(12) United States Patent
Cherniakov

(10) Patent No.: US 7,239,264 B2
(45) Date of Patent: Jul. 3, 2007

(54) RADAR TRANSPONDER

(75) Inventor: Mikhail Cherniakov, West Midlands (GB)

(73) Assignee: The University of Birmingham, Edgbaston, Birmingham (GB)

( * ) Notice: Subject to any disclaimer, the term of this patent is extended or adjusted under 35 U.S.C. 154(b) by 104 days.

(21) Appl. No.: 10/514,862

(22) PCT Filed: May 21, 2003

(86) PCT No.: PCT/GB03/02197

§ 371 (c)(1),
(2), (4) Date: May 20, 2005

(87) PCT Pub. No.: WO03/100457

PCT Pub. Date: Dec. 4, 2003

(65) Prior Publication Data

US 2005/0200515 A1    Sep. 15, 2005

(30) Foreign Application Priority Data

May 25, 2002  (GB) ................................. 0212076.4

(51) Int. Cl.
*G01S 13/74* (2006.01)
(52) U.S. Cl. .............................. 342/51; 342/42; 342/44
(58) Field of Classification Search ............. 342/42–51
See application file for complete search history.

(56) References Cited

U.S. PATENT DOCUMENTS 3,839,719 A * 10/1974 Elwood ....................... 342/458
3,988,734 A * 10/1976 Elwood ....................... 342/464
4,143,373 A *  3/1979 Chernick ....................... 342/88
2005/0200515 A1*  9/2005 Cherniakov ................... 342/51

FOREIGN PATENT DOCUMENTS

EP         0 056 297 A      7/1982
WO     WO 3100457 A1 * 12/2003

OTHER PUBLICATIONS

"Design of Transponder Signals and Recievers for Automatic Vehicle Location and Identification Systems", Donaldson, R., Communications, IEEE Transactions on vol. 23, Issue 5, May 1975 P(s): 489-500.*

Probanz, Carl W. et al., "A Microwave Non-Contact Identification Transponder Using Subharmonic Interrogation", Dept of Electrical Engr. UCLA, Microwave Symposium Digest I.E.E.E.. pp. 753-756 (May 23, 1994).

* cited by examiner

Primary Examiner—John B. Sotomayor
(74) Attorney, Agent, or Firm—Wells St. John, P.S.

(57) ABSTRACT

Transponders, receivers and position determining systems are described. In one embodiment, a transponder includes (i) an on-board receiver and associated receiving antenna for receiving incoming radar pulses in a first frequency band at an unknown pulse repetition rate, (ii) means for calculating the pulse repetition rate, (iii) a frequency synthesizer for generating a signal in a second frequency band, (iv) modulation means for modulating the signal generated by the frequency synthesizer so as to encode information into the signal, and (v) a transmitter and associated transmitting antenna for transmitting said modulated signal, wherein the transmitted signal is synchronized with the calculated pulse repetition rate of the incoming radar pulses, and modulation of the transmitted signal is such that accurate positioning of the transponder can be determined at a remote receiver.

19 Claims, 12 Drawing Sheets

Wake-up signal (WU)

RADAR TRANSPONDER

CROSS REFERENCE TO RELATED APPLICATION

This application is a 35 U.S.C. §371 of and claims priority to PCT International Application Number PCT/GB03/02197, which was filed 21 May 2003 (21.05.03), and was published in English, which was based on GB Patent Application No. 0212076.4 which was filed 25 May 2002 (25.05.2002), the teachings of which are incorporated herein by reference.

1. Field of the Disclosure

The present invention relates to a radar transponder and also to a receiver for the transponder.

2. Background of the Disclosure

The major functions of radar transponders are:
to reinforce a received ranging signal;
to modify this signal (in some cases) for identification of the transponder; and
to retransmit the (modified) signal back to the illuminating radar.

It will be understood that the return signal from the transponder will be delayed (relative to a normal reflection). As a result, the transponder replay will be indicated behind the real transponder position at the radar display. The signal delay in the transponder should be stable and of minimal duration (i.e. a fraction of microsecond or about 50 m in distance). The transponder signal will be readily identifiable at the display due to its brightness and/or by the nature of the signal modification.

Radar transponders replying at the main radar frequency are usually used for maritime applications. The maritime radar band (X-band) is 9.3-9.5 GHz. Examples of known transponders will now be described briefly.

Passive Reflector

The simplest device is a passive radar transponder or reflector that has relatively small size but a very large radar cross-section. A typical example is a corner reflector that may have linear dimensions as small as 0.5 m, but which may have an effective radar cross-section of several hundred square meters. These transponders still have limited visibility, especially in stormy weather. In addition no transponder-specific information is transmitted.

Active Reflector

A similar effect can be achieved by an electronic transponder that merely gains the radar signals. Its signature does not carry any special modulation and reflections observed at the radar display are not distinguished from passive reflections. Typical examples are the RAD-STAR active reflector (UK Electronica Ltd) or radar targets enhancer.

SART—Search and Rescue Radar Transponder

Referring to FIGS. 1a and 1b, incoming radar signals are passed to a receiver (Re) from a broad beam (low gain) horizontally polarized antenna (A). The antenna is near omni-directional in the horizontal plane and has approximately a ±35° beam pattern in elevation. The detected radar pulses (FIG. 1b, line A) trigger a triangular control waveform in a waveform generator (C) which is the input of a voltage control oscillator (VCO). The central frequency of the oscillator is 9.4 GHz, and, modulated by the control signal it sweeps between 9.3-9.5 GHz (FIG. 1b, line B). After amplification this signal is radiated via the same antenna (A). The effective transmitting power is about 0.25-0.5 W. The illuminating radar receives this signal and at a display this response appears as a set of dots, where the first dot corresponds to the marked object position (see FIG. 2). The first dot is formed by the sharp edge of the first control waveform (indicated by dotted line in FIG. 1b).

SART and similar transponders are relatively inexpensive and compact, but their use is severely restricted to distress and search and rescue situations according to International Maritime Organization (IMO) regulations.

Navigation Radar Beacons

Referring to FIG. 3, signals from illuminating radar are detected in the receiver (Re) via the antenna (A) and the signal central frequency $f_o$ is evaluated. Then, a frequency synthesizer (FS) generates a harmonic signal with this frequency and binary amplitude modulation (code) is added in a modulator (M). After amplification in an amplifier (Am) a signal is transmitted back through the antenna. The effective transmitting power is 2-3 W. The amplitude code is a Morse code letter, which appears at the radar display. By this method, different beacons can be identified (see FIG. 4, beacons marked A and B). This type of beacon introduces less interference than SART, but is technically more complex and expensive. In addition, as with the SART beacons, their use is strictly regulated by the IMO. The (fixed) position of navigation beacons is indicated on maritime navigation maps.

Furthermore, it will be understood that it is not possible to remove SART or navigation beacon signals from a radar display, which introduces the possibility of important features of the natural radar image being masked.

Avionic Transponders

Aircraft are equipped with radar transponders. These transponders respond to a radar signal at a dedicated radar frequency, which is non-coincident with the illuminating frequency. This sort of transponder requires a special high gain antenna at the radar site tracking the aircraft. The signal carries identification information, usually an aircraft identification and flight number. A radar operator can remove this signal from the display if required. These transponders use an especially dedicated frequency and the International Avionic Organization (IAO) regulates their applications. Transmitting power is more than 10 W. Referring to FIG. 5, an extra narrow beam directional antenna ($A_{NB}$) is mounted for rotation with the main radar antenna ($A_M$). This type of transponder (together with the specially designed radar) is very expensive.

It is an object of the present invention to provide a transponder (and associated receiver) which obviates or mitigates one or more problems associated with known transponders. In particular, it is an object of the present invention to provide a transponder for use with X-band radar (or in fact any radar), primarily but not exclusively for maritime applications, that could meet at least one (but preferably more) of the following requirements:

1. To be inexpensive for manufacture (eg. comparable with SART cost);

2. To transmit signals that do not require special permission for operation at any geographical point or other especially dedicated frequency;

3. For transponders to be mutually compatible (i.e. a radar can identify more than one transponder simultaneously), even if the transponders are in the same azimuth direction relative to the radar;

4. To transmit individual information (eg. 16-32 bits, or more if necessary) from the transponder to the radar in such a way that accuracy of signal position marking is not materially degraded;

5. Extra equipment at the radar side should be inexpensive, independent and operate with minimal interaction with the radar, as well as being compatible with any radar used currently for maritime applications.

6. To provide the transponder position measurement (distance) accuracy of at least ~50 m rms for a single look and to have a stable delay signal (fraction of microsecond).

7. For transponder signals to be selectively removable ("switched off") from the radar display by the radar operator, for example to avoid masking natural radar reflections. If more than one transponder signal is visible at a display, any signal or combination of these signals should be removable from the display.

8. To provide transponder response encryption such that the transponder response containing information can only be decoded by a specific radar (eg. transponder owner or authorised user).

SUMMARY OF THE DISCLOSURE

According to a first aspect of the present invention, there is provided a transponder comprising:

(i) an on-board receiver and associated receiving antenna for receiving incoming radar pulses in a first frequency band at an unknown pulse repetition rate, (ii) means for calculating the pulse repetition rate, (iii) a frequency synthesiser for generating a signal in a second frequency band, (iv) modulation means for modulating the signal generated by the frequency synthesiser so as to encode information into the signal, and (v) a transmitter and associated transmitting antenna for transmitting said modulated signal, wherein the transmitted signal is synchronised with the calculated pulse repetition rate of the incoming radar pulses, and modulation of the transmitted signal is such that accurate positioning of the transponder can be determined at a remote receiver.

From the foregoing introduction, it will be appreciated that the transponder of the present invention differs from known transponders in that the pulse repetition rate of the illuminating radar is calculated by the transponder and the transmitted signal is delayed so as to be synchronised with a subsequent radar pulse. In the known SART-like transponders and navigation beacons, the amount of information which can be carried by the return signal is limited: increased processing results in increased delay in the return signal which in turn results in decreasing positional accuracy.

The information/position problem is overcome in avionics by what amounts to the use of two radar systems. Positional information is derived from the main antenna, whereas identification information is derived from the incoming transponder signal at the separate high gain antenna, requiring a specially dedicated frequency band.

Preferably, the receiving antenna is omnidirectional in a horizontal plane.

Preferably, the second frequency band of the signal generated by the frequency synthesiser is non-overlapping with the first frequency band and is preferably the ISM band (i.e. about 2.45 GHz), although it will be appreciated that a specially dedicated frequency could be used. Preferably, the first frequency band is the X-band (i.e. 9.3 to 9.5 GHz), although any other frequency band such as, the C or S band could be used.

Preferably, the transponder also comprises at least one amplifier to boost the strength of the transmitted signal. Preferably, a receiving amplifier and a transmitting amplifier are provided. The receiving amplifier is preferably in two parts: a low power consumption amplifier which activates all other parts of the transponder when a potential radar pulse is detected, and a higher quality receiving amplifier which is only activated when illumination by a train of radar pulses is confirmed.

Preferably, the signal modulation means is spread spectrum modulation means. More preferably, the spread spectrum modulation means spreads the transmitted signal over at least a 1 MHz frequency spectrum. It should be noted that provision of spread spectrum modulating means not only provides the means by which positional accuracy of the transponder position is achieved, but also meets the legal requirement of at least a 1 Mz spread spectrum when operating in the ISM band.

The receiving and transmitting antennas may be constituted by a single antenna, in which case isolation and duplexing means are preferably provided. This may be achieved by provision of means to maintain the transmitter in an off state during pulse repetition period calculation, and to block signal reception at the antenna during signal transmission. Alternatively, the transmitter may be adapted to delay signal transmission during the relaxation period of the receiving antenna. In the case of the antennas being separate, isolation and duplexing means may still be required.

According to a second aspect of the present invention, there is provided a receiver, said receiver comprising:

(i) a receiving antenna for receiving modulated signals transmitted from a transponder in accordance with the first aspect of the present invention, and (ii) signal processing means for extracting data and positioning information from said signals and (iii) information output means.

Said information output means may be connectable with a printer or (preferably) a display, such as an X-band radar display via a cable or other direct connection.

Preferably, however, the receiver includes a frequency synthesiser adapted to generate modulated wideband pulses in the X-band, such that when a micro-transmitter provided for this pulse transmission is positioned adjacent the receiving antenna of an X-band radar, positional and other information (eg. Morse code letter identification code) is observable at the X-band radar display, thereby obviating the need for a direct connection between the receiver and the display.

In a highly preferred embodiment, means are provided to enable a radar display operator to select which (if any) information is displayed.

It will be understood that the invention also resides in a system comprising a transponder in accordance with the first aspect and a receiver in accordance with the second aspect, for use with an X-band-based radar.

BRIEF DESCRIPTION OF THE FIGURES

Embodiments of the invention will be described by way of example only, with reference to the accompanying drawings in which.

DETAILED DESCRIPTION OF THE DISCLOSURE

Figure 1A:
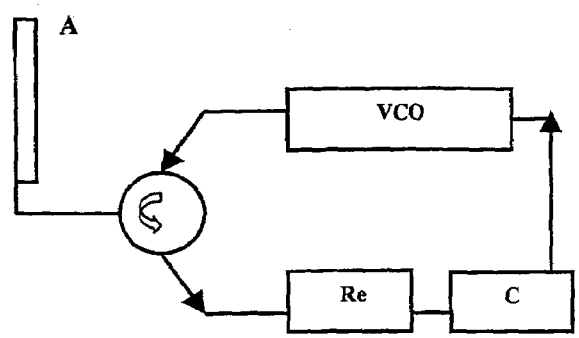
FIG. 1a is a block diagram of a known SART.
Figure 1B:
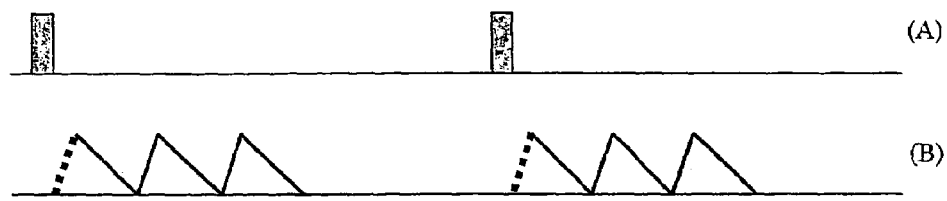
FIG. 1b shows the generation of control signals by the SART of FIG. 1a in response to detected radar pulses.
Figure 2:
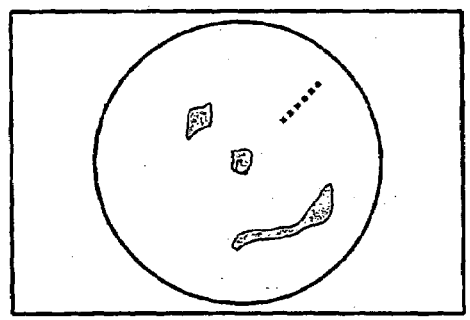
FIG. 2 shows the appearance of the SART of FIG. 1a on a radar display.
Figure 3:
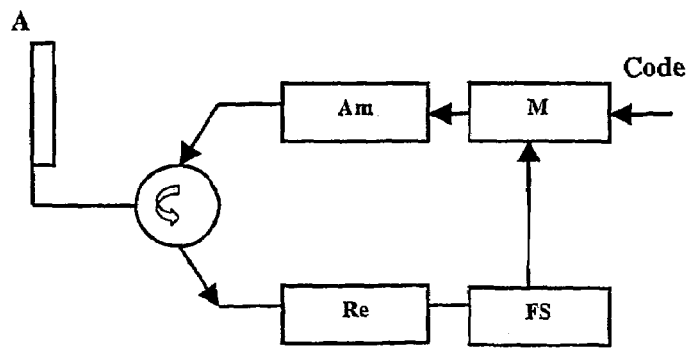
FIG. 3 is a block diagram of a known navigation beacon.
Figure 4:
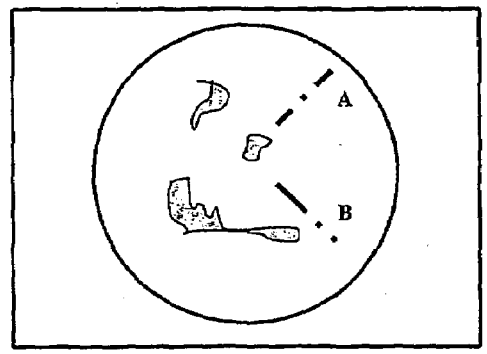
FIG. 4 shows the appearance of two different navigation beacons on a radar display.
Figure 5:
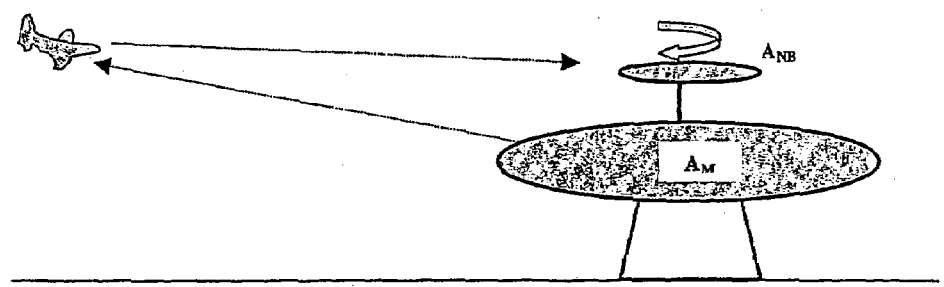
FIG. 5 is a schematic representation of a known avionics radar-transponder system.
Figure 6:
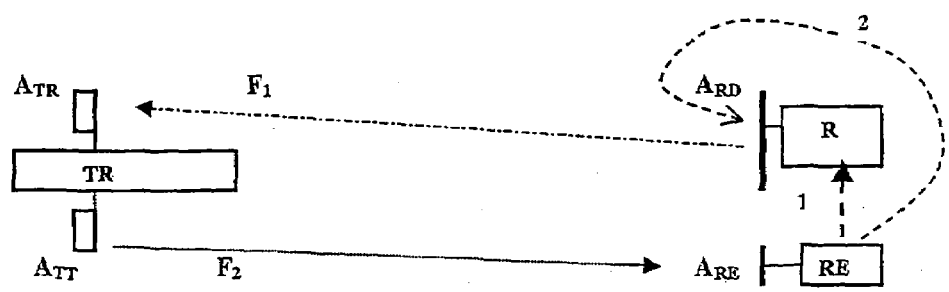
FIG. 6 is a general block diagram of a system in accordance with the present invention.

A generic system block-diagram is shown in FIG. 6. Basically, the system comprises a search radar including display (R) having a transmitting/receiving antenna ($A_{RD}$) operating in the X-band (9.3-9.5 GHz) connected to a receiver (RE) and associated receiving antenna ($A_{RE}$) operating in the ISM band (2.45-2.5 GHz), and a transponder (TR). The transponder has a receiving antenna ($A_{TR}$) operating in the X-band (9.3-9.5 GHz) and a transmitting antenna ($A_{TT}$) operating in the ISM band (about 2.45 GHz). It will be understood that the search radar and associated ISM band receiver will be at a first location (eg. on a fishing vessel or customs vessel) and the transponder will be at a second location (eg. attached to a fishing net or licensed fishing vessel). As will be explained in more detail below, the receiver (RE) can be connected directly by cable to the radar display (arrow 1) or by an air interface (arrow 2) without a requirement for any radar-receiver cable connections, thereby making it universally useable with any X-band radar type.

The transponder uses two frequencies $F_1$ and $F_2$. The channel from the radar to the transponder will be referred to as the 'forward link' and the channel from the transponder to the receiver will be referred to as the 'reverse link'. $F_1$ is the radar ranging signal carrier (~9.3-9.5 GHz) and is the receiving frequency for the transponder. At this frequency, the radar ranging signal is detected by the transponder. $F_2$ is the transponder transmitting frequency (~2.45 GHz—corresponding to the worldwide licence free ISM band). This frequency will be considered as the main one for operation of the transponder's transmitting antenna. However, it will be understood that the reverse link could be operated in any other frequency bands without significant modification, at least for frequencies above 150 MHz and below 10 GHz.

Desirable operating objectives and performance assumptions (both described in more detail below) are:

1. Two different frequencies are used: $F_1$~9.3 GHz for the forward link and $F_2$~2.45 GHz for the reverse link. Up-conversion back to $F_1$ when it is necessary to avoid electrical connection between the receiver and the radar.

2. The X-band antenna at the transponder has horizontal polarization, is omni-directional in azimuth and ±(40°-60°) in elevation. This could, for example be a slotted waveguide antenna with a preselector connected via a waveguide-microstrip junction to a low noise amplifier. The ISM band antenna at the transponder (omnidirectional in horizontal plane) has low gain ($G_{ATT}$)~2 dB and has vertical polarization.

3. The receiving antenna is also vertically polarized and omnidirectional in azimuth plane with gain ($G_{ARE}$)~8 dB. The use an omnidirectional $A_{RE}$ antenna is the key to a low cost receiver.

4. The reverse link should fit into the ISM band requirements (N15, FCC or similar regulations) i.e. there should be a spread spectrum modulated over at least a 1 MHz frequency band and operation should be with a specified effective radiating power (in the example which follows, FCC requirements are used).

5. At the reverse link, the signal should carry information for transponder identification, for example binary data with 16-32 bits. Different transponder-receiver systems can use different spread-spectrum codes as well as different central frequencies within the ISM band for both interference rejection and encryption purposes). In this case third party system's receivers will not receive any signals. Frequency separation of about 2.5 MHz between possible frequency channels provides about 20-40 independent 1 MHz channels within the 2.45 GHz ISM band.

6. The system identification bits ('0' and '1') can be coded by using two different M-sequences (as in the present case), for spectrum spreading with the same length M=127 bits (or any other suitable length), generated by 7 bits shift registers with different feedbacks, but Gold codes (or similar) could also be used.

7. The receiver will:
   a) Detect signals from transponders and select distance information,
   b) Decode the code of transponders,
   c) Identify and display (if necessary) the desired transponder identification number,
   d) Form special base-band pulses that form one Morse code letter display code (DiCo). This signal Will be sent to the radar display directly or via an X-band microtransmitter for the transponder's identification number visualization on the radar display.
   e) Provide access for a radar operator to switch the DiCo signal on and off.
   f) Provide a standard connector for data exchange with a PC.

8. Connection between the radar and the receiver may be:
   b. By cable into the radar display (arrow 1, FIG. 6), or
   c. By an air interface (microtransmitter) at $F_1$ frequency without any radar-receiver cable connections (arrow 2, FIG. 6).

9, Transponders may be designed to allow access for easy change of their identification numbers and carrier frequency, depending on the required application.

The general requirements for each aspect of a practical system will now be described.

Reverse Link Power Budget

Horizon and Transmitting Power

Figure 7:
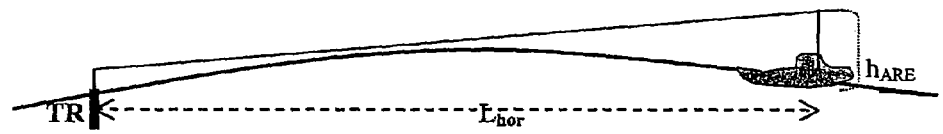
FIG. 7 is a schematic illustrating the relationship between horizon distance and the relative heights of the transponder and radar antenna.

The transponder antenna will be positioned low relative to the surface in most envisaged maritime applications, eg. fishing nets, small craft etc., although, referring to FIG. 7, the minimum recommended antenna height ($h_{ATR}$) is about 1 m. The receiver's antenna height ($h_{ARE}$) will generally be considerably greater. Depending on vessel type, $h_{ARE}$ could be anything from about 2-3 m to as much as 15 m or more. In any situation it is recommended to position the receiving antenna as high as possible.

The radar horizon distance ($L_{hor}$) can be approximated as:

$$L_{hor}^2[km] \approx 17 h_{ARE}[m]$$

or $$L_{hor}[m] = \sqrt{17 h_{ARE}} \, 10^3$$

The horizon distances $L_{hor}$ for some typical receiving $h_{ARE}$ are shown in table I.

TABLE I radar horizon for different height receivers (transmitter height = 1 m)

| $h_{ARE}$ [m] | 2 | 5 | 15 | 25 |
|---|---|---|---|---|
| $L_{hor}$ [km] | 6 | 9 | 16 | 20 |

At the maximum distance $L_{hor}$, the receiving signal power ($P_{RE}$) by $A_{RE}$ will be:

$$P_{RE} = \frac{P_{TR} G_{ATT} G_{ARE} h_{ATT}^2 h_{ARE}^2}{\left(\sqrt{17 h_{ARE}} \, 10^3\right)^4} = \frac{P_{TR} G_{ATT} G_{ARE} h_{ATT}^2}{17^2 \times 10^{12}}$$

assuming $G_{ATT}=1.6$, $G_{ARE}=6$, and $h_{ATT}=1$ m, then $$P_{RE} \approx 3 \cdot 10^{-14} P_{TR}$$

where $P_{TR}$ is the transponder transmitting power.

The noise power ($P_N$) at the matched filter output (see below) is:

$$P_N = kTR(N_f-1)$$

where $k=1.38 \times 10^{-23}$, T=600 (effective temperature in K: 300K due to the environment and 300K due to space radiation), R is the transmitting symbols data rate ($R_d$) in Hz (1 kHz–1 kbit/s), $N_f$ is the receiver noise value, assume $N_f$=2. So, $$P_N \approx 8.3 \cdot 10^{-21} \cdot R_d$$

and the signal to noise ratio (S/N) at the receiver output is $$\left(\frac{S}{N}\right) = \frac{P_{RE}}{P_N} \approx 0.36 \cdot 10^7 \frac{P_{TR}}{R_d}.$$

The above analysis does not take into account losses due to wave propagation in the atmosphere and any receiver non-optimality, etc. Assuming that these losses are about 6 dB:

$$\frac{S}{N} \approx 10^6 P_{TR}/R_d$$

Figure 8:
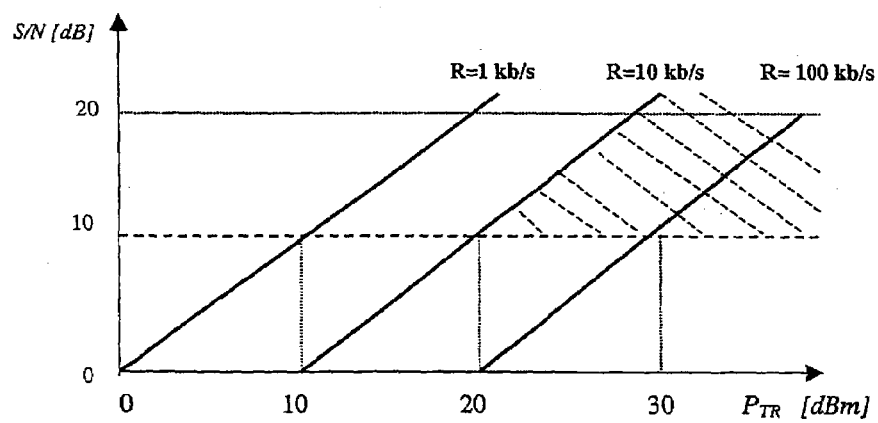
FIG. 8 is a graph of S/N ratio plotted against transponder transmitting power, illustrating the minimum power required to achieve a desired reliable data transmission rate.

The S/N ratio for different $P_{TR}/R$ is shown in FIG. 8. Reliable reception requires the S/N ratio to be at least 10 dB. So, starting with 20 dBm transmitting power, a suitable reverse-link power budget can be provided to enable a 10 kbit/s data transmission rate. However, it is important to note that the transponder transmits the same data about 25 times a minute. Using for the signal processing data integration from period to period and with appropriate correction, the above data transmission rate could be increased, keeping the same bit error rate (BER) over the integration period.

Signal Spreading

Figure 9:
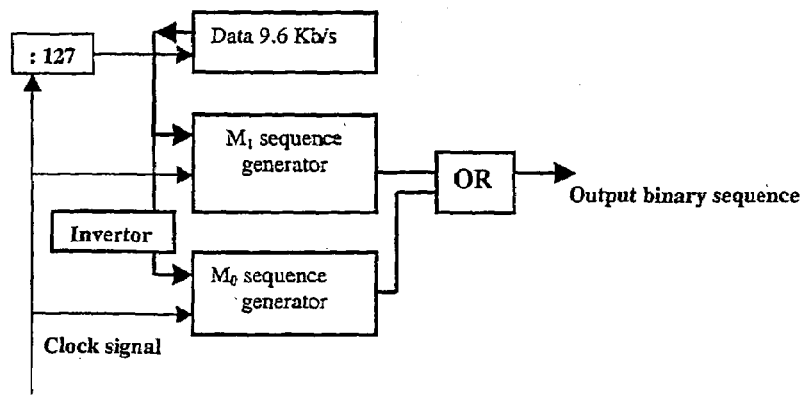
FIG. 9 is a block diagram showing M-sequence generation.

M-sequences are used for signal spreading (when required) and data coding. The length of the sequence is determined by, in this case, the requirement of spectrum spreading over at least 1 MHz in the ISM band. Assuming the standardised data rate $R_d$=9.6 kbit/s or ~10 KHz occupied spectrum, the minimum sequence length is 100. So, for '0' data coding one M-sequence of 127 bits is conveniently used and for '1' another M-sequence of 127 bits is conveniently used. The level of cross-correlation function between these two sequences will be: the maximum sidelobes' level −20/127 (or −16 dB); an average (rms) sidelobes' level −6/127 (or −26 dB). (The values of −20 dB and −6 dB being representative of typical marine radar maximum and rms sidelobe values respectively). The coding method is shown in FIG. 9.

Distance Indication and Measurement Accuracy

At the reception side, the distance measurement accuracy (evaluation on the radar display) depends on two types of errors: systematic and random. Systematic errors are minimised by the system hardware and software tuning. Random errors fundamentally depend on the receiving signal statistic. The distance measurement noise error (in delay) ($\sigma_{Nt}$) is evaluated from the equation $$\sigma_{Nt} \approx \sqrt{\frac{\tau}{4B_a(S/N)}}$$

where $\tau$ is the M-sequence chip duration (0.82 µs in the considered example), (S/N) the signal-to-noise ratio at the matched filter output and $B_a$ is the receiver bandwidth. From previous considerations, it has been established that S/N is at least 10 to ensure reliable reception of 10 kbit/s data, $\tau \approx 0.82 \cdot 10^{-6}$ (corresponding to 1.2 MHz bandwidth) and $B_a \sim 1$ MHz, hence:

$$\sigma_{Nt} \approx \sqrt{\frac{0.82 \cdot 10^{-13}}{4}} = 1.45 \cdot 10^{-7} \text{ or } 0.145 \mu s$$

In terms of the distance measurement this error is $\sigma_{ND} \approx 22$ m rms.

Another type of random error is due to the finite time interval between signal sampling ($T_S$). This error ($\sigma_{dt}$) is uniformly distributed over the sampling interval and its rms is given by $$\sigma_{dt} \approx T_S/\sqrt{12}$$

The minimal sampling interval $T_S = \tau$ or 0.82 µs and the error is $$\sigma_{dt} \approx 0.82/\sqrt{12} = 0.23 \mu s$$

The total random error of the distance measurement ($\sigma_t$) is $$\sigma_t = \sqrt{(0.16)^2 + (0.23)^2} = 0.28 \mu s$$

and the distance measurement error over one radar scan is $$\sigma_D \approx 30 \text{ m rms}$$

This error value is small enough to allow practical embodiments of the system to be designed.

Essential losses in S/N (up to 6-7 dB, and 4 dB on average) can occur in a digital matched filter without clock synchronisation on one sample per chip duration. These losses can be reduced to an average of 1.2 dB by using 2 samples per chip duration. This also leads to some sampling error reduction:

$$\sigma_{dt} \approx \frac{0.42}{\sqrt{12}} = 0.12 \mu s$$

and the total random error over one scan will be 0.2 µs or 20 m rms.

The Radar Signals

All X-band radars for maritime applications have slightly different ranging signal parameters. To illustrate this point, relevant parameters are given in Table 2 below for radars from two major manufacturers. As will be explained below, the transponder of the present invention is designed to operate with any existing radar system, irrespective of the specific values of the listed parameters or the particular operational mode of radar.

TABLE 2

| Parameter | Radar signal parameters | |
|---|---|---|
| | JRC | Furuno |
| Antenna rotation speed ($W_{rot}$) [rpm] | 20; 24; 27 | 24 |
| Pulse repetition frequency ($F_{PR}$) [Hz] | 520; 780; 1560; 2080; 2250 | 600; 1200; 2100 |
| Pulse duration ($\tau_p$) [µs] | 0.08; 0.3; 0.8 | 0.08; 0.3; 0.8 |
| Beam width ($\Delta\theta^0$) [deg] | 7°; 5.2°; 2°; 1.2°; 0.8° | 5.2°; 3.9°; 2.2° |
| Antenna side lobe level (first) [dB] | 20 | 20 |
| Transmitting power, peak [kW] | 1.5–25 | 1.5–30 |

Figure 10:
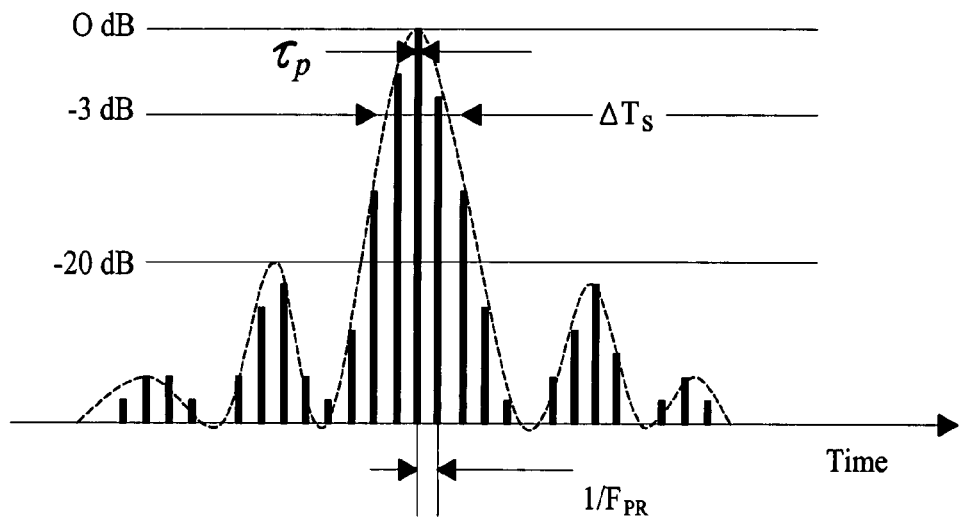
FIG. 10 shows an amplitude modulated radar pulse train.

Referring to FIG. 10, the signal reflected from a point target appears as a train of pulses, with modulated amplitude according to the antenna pattern shape. To ensure the viability of the system for all radars, the most difficult case will be considered, that is for the shortest return train duration $\Delta T_S$. The shortest train corresponds to the narrowest antenna beam $\Delta\theta = 0.8°$. When the antenna has a rotation speed of 25 rpm, the train duration $\Delta T_S$ is given by:

$$\Delta T_s = \frac{25 \cdot 0.8}{360 \cdot 60} = 5ms$$

The number of pulses ($N_p$) over $\Delta T_S$ is $$N_p = \Delta T_S F_{PR}$$

and for the lowest $F_{PR} = 500$ Hz $$N_{Pmin} = 3\text{-}4$$

This will be a relatively rear case, but is discussed hereinafter as the limiting situation.

The Transponder Transmitting Timing Diagram

The methods described below are based on the novel principle of evaluating an unknown pulse repetition period at the transponder. By this method, the transmitted pulses can be synchronised with the received pulses thereby allowing accurate determination of the transponder position as well as enabling a significant amount of data to be sent by the transponder.

Timing Diagram Without Time Division Duplexing

Initially, it will be assumed that the transponder is simultaneously able to receive signals (in the X-band) and to transmit signals (in the ISM band). It is also assumed that these signals can be separated in frequency domain (frequency division duplexing). However, as will be seen below simultaneous transmission/reception is not a prerequisite for a successful system.

From the foregoing radar pulse train duration analysis, it follows that the transponder can transmit data with a periodical cycle close to 2 ms but bigger than 2 ms. In this case, at least one signal for target marking at the radar display will be received (setting the maximum cycle duration). It is desirable to operate close to this maximum possible cycle duration to maximise the number of data bits which can be transmitted.

Figure 11:
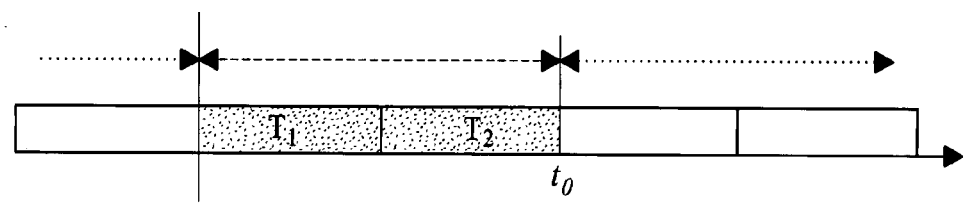
FIG. 11 shows the data cycle in an embodiment of the present invention.
Figure 12:
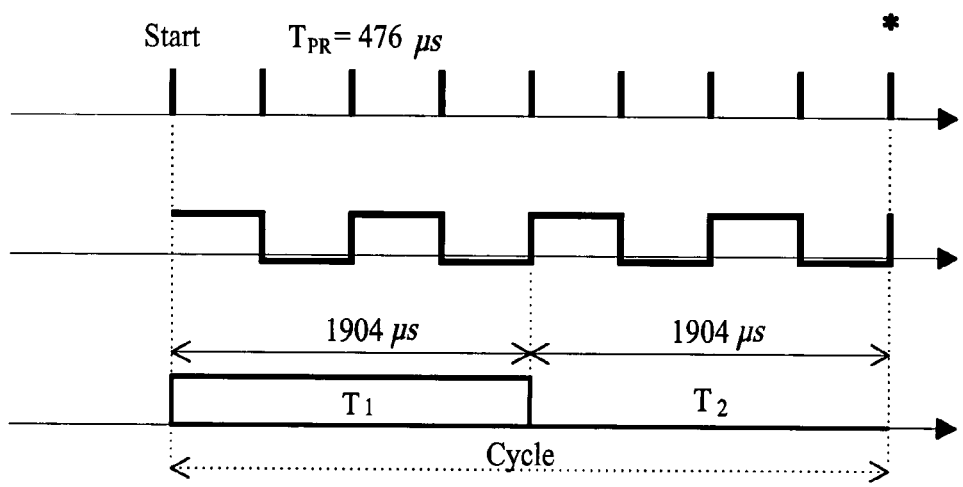
FIGS. 12 and 13 illustrate formation of a data cycle for radars having $F_{PR}$=2100 Hz (FIG. 12) and 600 Hz (FIG. 13)

The cycle timing diagram is shown in FIG. 11. The minimum number of cycles to be transmitted corresponds to the shortest radar train (~5 ms). The cycle consists of two parts with equal duration (number of chips) $T_1=T_2$ where the start of $T_1$ corresponds to the first detected radar pulse and the end of $T_2$ (time moment $t_o$) also corresponds to one of the received radar signal with an accuracy of half chip duration ~0.5 μs or better. How to form this cycle is shown in FIG. 12 using as an example $F_{PR}$=2100 Hz or repetition period (that is $1/F_{PR}$) $T_{PR}$=476 ms. The method enables the pulse repetition period to be evaluated at the transponder. The detected radar pulses are divided successively by 2 (in frequency) until the divider output half-period duration is closest but longer than 1 ms. This will be universally applicable for any type of radar. In the illustrated case, the first division output (half period) is 952 μs, and the second division output (half period) is 1904 μs.

Thus, regardless of the actual value of $F_{PR}$, all pulse repetition frequencies are divided by 2 at least once. Further division will depend on the result of the half period duration evaluation. If it is less than 1 ms this (frequency) sequence will be further divided until the half period duration crosses the 1 ms boundary. In the case where $F_{PR}$=2100 Hz, $T_1$ (and $T_2$)=1904 μs.

Figure 13:
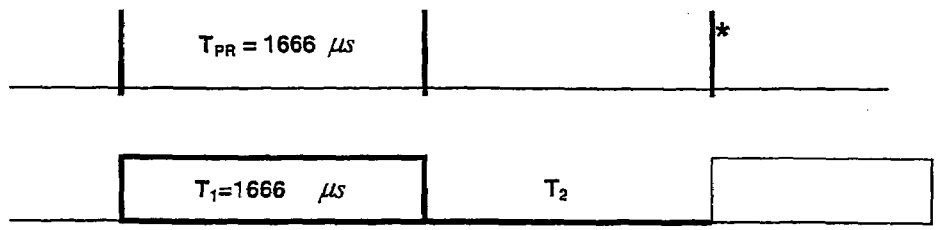

The same procedure when $F_{PR}$=600 Hz is shown in FIG. 13. Only one division is used and $T_1$(and $T_2$)=1666 μs.

Figure 14:
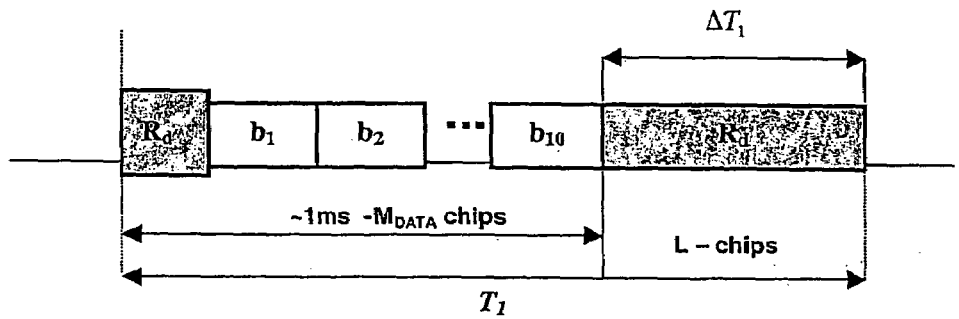
FIGS. 14 and 15 illustrate respectively the $T_1$ and $T_2$ half cycle structures for transmitting information bits.

From the above, it will be appreciated that, initially, the actual duration of cycle at the transponder side is unknown and depends on the value of $F_{PR}$. Since the minimum $T_1$ is ≧1 ms, then at least 10 bits with 100 μs bit duration can be transmitted over 1 ms. This 10 kb/s figure also coincides with the realistic power balance calculated above. Then, each of these bits is spread by an M-sequence. To simplify the explanation assume that the chip duration is 1 μs and one bit is spread over a 100-bit M-sequence. $T_1$ is always more than 1 ms and assume that $T_1$=1 ms+$\Delta T_1$. The format adopted for the cycle structure of $T_1$ is shown in FIG. 14.

Figure 15:
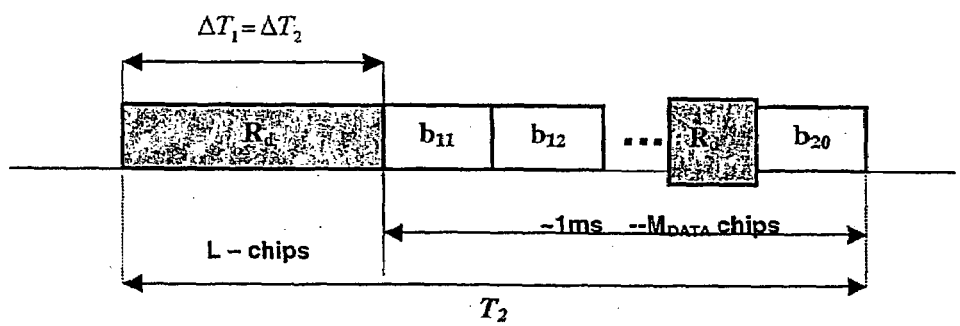

The cycle starts with 50 chips of random data ($R_D$). This is very convenient for the first bit ($b_1$) detection, as the receiver transient will be finished by this time. Then, 10 bits of data ($M_{DATA}$) spread over a 1 MHz band is transmitted. For the rest of the $T_1$ time interval, random chips (L random chips ($R_D$) representing "0" and "1" from a long M-sequence) are transmitted. Altogether therefore, 1000+L+50 chips are transmitted in the $T_1$ interval. It will be understood that the value of L will be known at the end of the time period $T_1$. The second part of the cycle—$T_2$ is filled with 10 data bits (in the general case these do not necessarily coincide with the data bits transmitted in $T_1$) and L+50 chips of random data as shown in FIG. 15.

It will be noted that the transmission order in $T_2$ is L random chips followed by the data bits. The additional 50 random chips are transmitted immediately preceding the last data bit ($b_{20}$). This helps to identify more clearly the last data bit (although it will be appreciated that in other embodiments the distribution of the L+50 random chips may be different with respect to the data bits, as long as the $T_2$ cycle is ended by the last data bit). It is important to note that the end of the last data bit coincides with one of the illuminating radar pulses (since the transmission cycle, $T_1+T_2$ is synchronised with the pulses from the illuminating radar) and is used for target marking on the radar display.

Figure 16A:
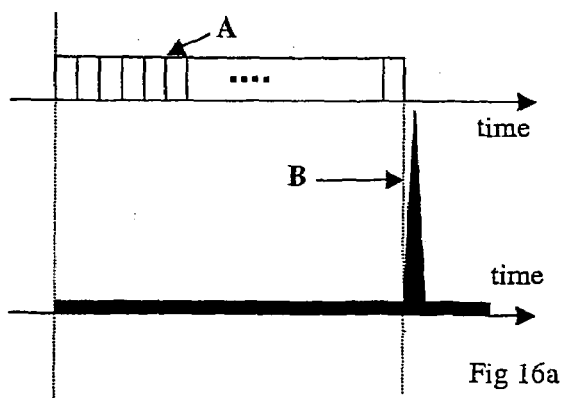
FIGS. 16a and 16b show the output from a digital matched filter for a single data bit (FIG. 16a) and for a complete data cycle (FIG. 16b)

So, with a 10 kbit/s data rate, 20 bits of information will be transmitted over 2 ms. These cycles will be repeated until the end of the radar signal train. Assuming that at the receiving side there is a digital filter matched to the transmitting M-sequences, if an information bit spread by the M-sequence is present at the filter input, the output waveform from the filter will correspond to the M-sequence autocorrelation function. This is shown schematically in FIG. 16*a* where arrow A indicates one data bit spread by an M-sequence and the corresponding output waveform at a matched filter is shown (arrow B).

Figure 16B:
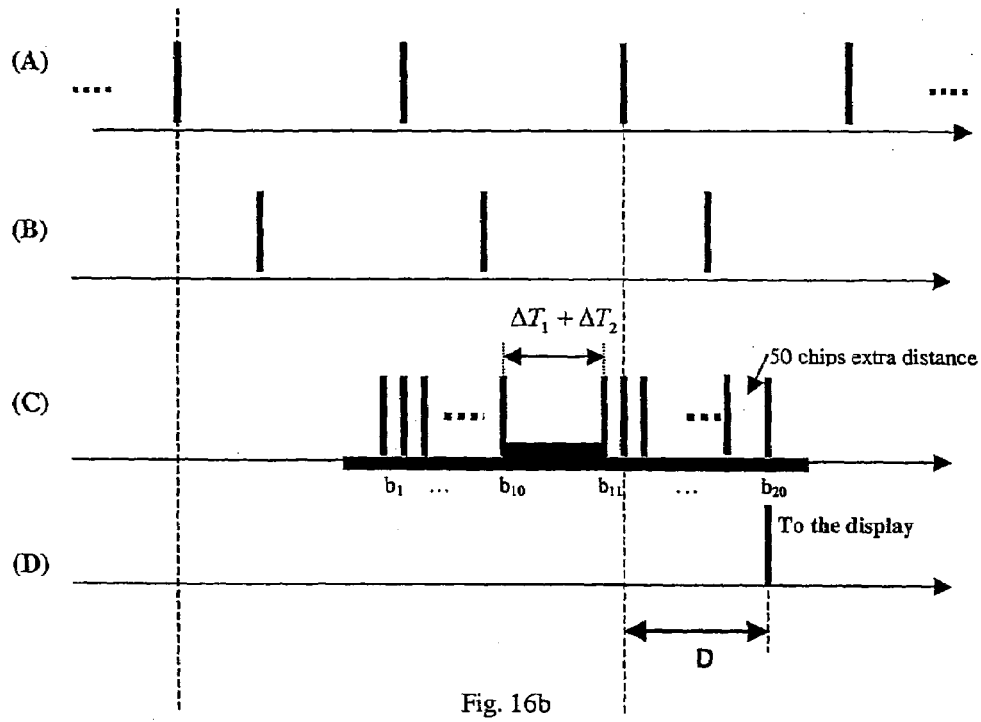

The data bits signal waveform at the matched filter output is shown in FIG. 16*b* for the complete cycle. Timeline A represents the transmitted radar pulses from the ranging radar, timeline B corresponds to the pulse train detected at the transponder, timeline C represents the output from the matched filter and timeline D represents the output to the radar display. The delay between the radar transmitting pulse and the end of the last data bit ($b_{20}$), at the output of the matched filter, corresponds to the distance (delay-D) between the radar and the transponder. This is because the end of the last data bit coincides with the end of $T_2$ and at the transponder side coincides in time with one of the received radar ranging pulses (see FIG. 12 and FIG. 13, corresponding radar pulse marked with '*'). This pulse is sent to the display. Thus, delay D corresponds to the signal delay (distance) to the transponder.

Timing Diagram with Time Division Duplexing

Requirements for transmitting-receiving channel decoupling at the transponder can be reduced if during the reception time (at X-band) no signal is transmitted (at ISM band). This can be achieved by evaluating the pulse repetition period when the transponder transmitter is not radiating power. The first radar pulse detected at the transponder initiates a counter and the second detected pulse stops the counter to evaluate $T_{PR}$. To provide the necessary degree of accuracy it is desirable for the clock signal period to be about 4 times less than the chip duration when the counter input is a high frequency pulse sequence ~4 MHz in this example. This provides period measurement accuracy of 0.07 microseconds rms. Once $T_{PR}$ has been evaluated, the receiver is blocked and the transmitter starts to radiate power. The transmitting signal contains the same 20 data bits and L+50 random bits as described above. After the end of the cycle, the transmitter is switched off and the receiver is unblocked. With the arrival of the nearest radar pulse this cycle will be repeated. The number of random bits L is calculated from the simple equation:

$$L=M \cdot N-(D+50)$$

where M is the number of pulse repetition periods, N is duration of the pulse repetition period measured in the chip duration, D is the duration of 20 transmitting bits measured in the chip duration. N and D are known. M is the minimal integer corresponding to an inequity $$M>(D+50)/N$$

Figure 17:
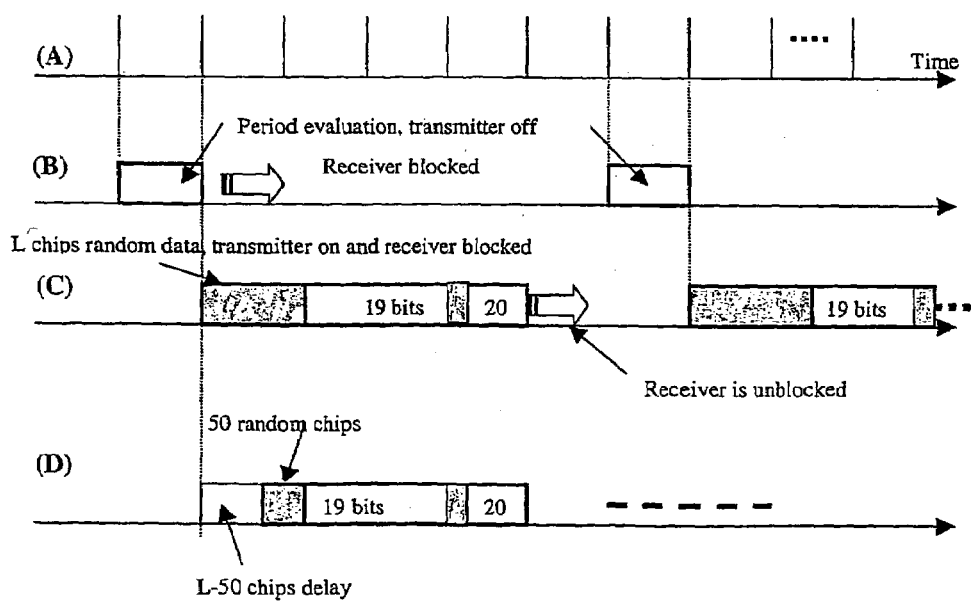
FIG. 17 shows an alternative time sequence with time division duplexing.

The appropriate timing diagram is shown in FIG. 17 where timeline A indicates the illuminating pulse train, and timelines B and C indicate the timing of blocking the transponder receiver and transmitter.

An alternative solution to the decoupling problem (illustrated diagrammatically in timeline D of FIG. 17) is that after evaluation of $T_{PR}$, rather than transmitting L random chips, the transmitter generates random data only over the last 50 chips of the L-chip duration, no transmission occurring over the first L−50 chip period (this accounts for the transient relaxing period at the receiving side).

For both timing diagrams it is important to know the position of one particular bit, which carries the range information. In the example above this was bit number 20 and it was proposed to count the receiving bits. A potential problem with this method is miscounting due to non-detection of a bit, thereby resulting in an error in the distance evaluation. If, for example, the probability of one bit missing is $10^{-3}$ the chance that one out of 20 bits will be missed is $2 \times 10^{-2}$. An alternative is to modulate a specific bit and derive range information from this "special" modulated bit. Where a specific bit is modulated, the probability is not compounded, and the error likelihood remains at $10^{-3}$. In the sections below where the transmitter and receiver are described, this special modulation type will be introduced.

Transponder

Figure 18:
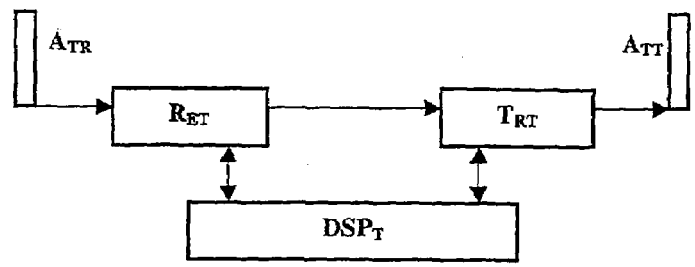
FIG. 18 is a basic block diagram of a transponder in accordance with the present invention.

A practical embodiment of an operational transponder system will now be described by way of example only. Referring to FIG. 18, the transponder basically comprises five subsystems: a receiving antenna ($A_{TR}$) operating in the X-band (9.3-9.5 GHz), a transmitting antenna ($A_{TT}$) operating in the ISM band (2.45-2.5 GHz), a receiver ($R_{ET}$), a transmitter ($T_{RT}$) and a digital signal processor ($DSP_T$). At least the receiver, transmitter and signal processor are housed in a weatherproof casing, together with a battery power supply.

X-band Antenna ($A_{TR}$)

The receiving antenna ($A_{TR}$) has an omnidirectional pattern in the azimuth plane, and $\pm 40°$-$60°$ pattern in the elevation plane, with horizontal polarization. Mechanically it is connected directly to the transponder casing and is electrically connected to an input of the receiver. In the present embodiment a waveguide slotted antenna having low waveguide losses (0.5 dB), a bandpass filter with the passband 9.3-9.5 GHz at -0.2 dB attenuation levels, and a waveguide-microstrip junction is employed.

ISM Band Transponder Antenna ($A_{TT}$)

The transponder antenna operates at least over ISM bands 2.45-2.5 GHz and is omnidirectional in the azimuth plain and has a $\pm 40°$-$60°$ pattern in the elevation plane.

The antenna is a monopole antenna with ~2 dB gain. In this embodiment it is housed within a hermetic casing, although such a casing is optional.

Transponder Receiver ($R_{ET}$)

Figure 19:
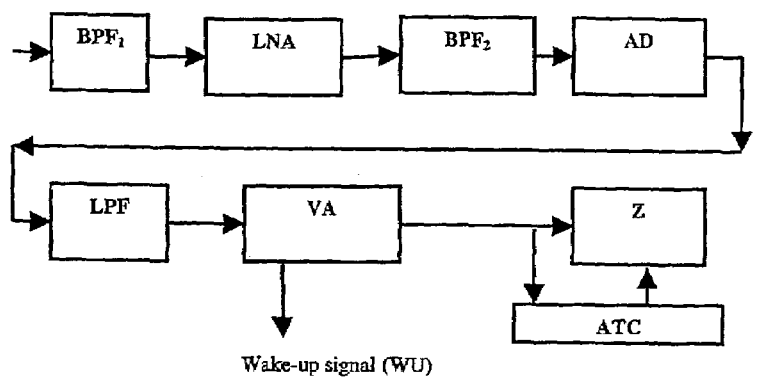
FIG. 19 is a block diagram of a receiver subsystem of the transponder of FIG. 18.

The receiver block diagram is shown in FIG. 19. Basically, the receiver comprises a low noise amplifier (LNA) with a first band pass filter ($BPF_1$) on the input side and a second band pass filter ($BPF_2$) on the output side and an amplitude detector (AD) on the output side of the second band pass filter ($BPF_2$). $BPF_2$ is optional and the slotted antenna itself can act as $BPF_1$, eliminating the requirement for a separate filter. On the output side of the amplitude detector are successively a low pass order filter (LPF) and a video amplifier (VA).

Figure 20:
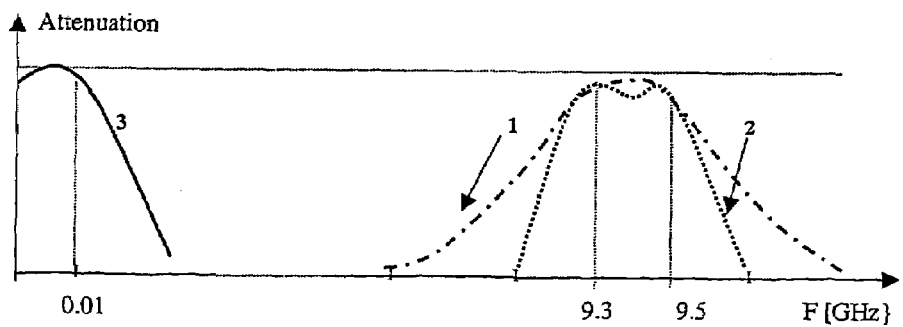
FIG. 20 illustrates the frequency response of input filters used in the transponder of FIG. 18.

The first band pass filter ($BPF_1$) has low losses that minimise the chance of the low noise amplifier (LNA) overloading due to strong out-of-band signal presence. The pass band is 9.3-9.5 GHz for a -0.2 dB attenuation level. The losses within the pass band should be less than 0.3-0.5 dB. Frequency response is shown in FIG. 20—line 1. In the present embodiment this filter is combined with the waveguide antenna ($A_{TR}$).

The second band pass filter ($BPF_2$) is similar to $BPF_1$ but may permit bigger losses in the passband and has a more stepped response to frequency than $BPF_1$). Intermodulation interferences at the amplitude detector non-linearity will be reduced. Frequency response is shown in FIG. 20—line 2. Both filters are simple and inexpensive. It should be noted that the second filter may be omitted in other embodiments if $BPF_1$ is of sufficient. quality (eg. using waveguide technology).

The low noise amplifier (LNA) has a gain of about 12-16 dB and a noise value $N_f$ of 2-3 dB. The noise value requirements are not critical and can be slightly relaxed if cost is an overriding issue. The Frequency band is 9.3-9.5 GHz.

There are no special requirements as to the nature of the amplitude detector but zero bias diodes are preferred. The noise level at the AD input can be evaluated (assuming $N_f$=2.5 and the noise band 200 MHz):

$$P_N = kTB_N(N_f - 1)G_{LN} \approx 0.8 \cdot 10^{-11} \text{ W or} \approx -80 \text{ dBm}$$

The minimal signal levels correspond to the lowest radar transmitting power (i.e. 1.5 kW), the broadest antenna 7°×30° that corresponds to the lowest antenna gain −2 dB and the maximum distance (~25 km for this particular embodiment). The general equation is $$P_{RE} = \frac{P_{TR}G_{TR}G_{RE}\lambda^2}{(4\pi)^2 R^2}$$

$$= \frac{1.5 \cdot 10^3 \cdot 200 \cdot 1 \cdot (0.03)^2}{(4 \cdot 3.14)^2 \cdot 625 \cdot 10^6} \approx 3 \cdot 10^{-9} W \text{ or } -55 \text{dBm}$$

The minimal signal at the AD will be ~13 dB higher: −42 dBm

The low pass first order filter (LPF) in the base-band corresponds to the spectrum occupied by the shortest radar ranging signal and in the present considered case the cut-off (−3 dB) frequency is ~10 MHz, that is matched to the shortest possible radar pulse duration (~10 ns pulse). Assuming the detector gain is −10 dB (this can be varied according to the particular LNA and diode parameters) and bandwidth reduction in 10 dB, the absolute noise level at the filter output ($P_{NAD}$) will be 20 dB less in comparison with the input ($P_N$) of −100 dBm. The minimal signal will be reduced by 10 dB and will be $P_{READ}$=−65 dBm. The filter frequency response is shown FIG. 20—line 3.

The video amplifier is a linear amplifier (LiVA) with automatic gain control (AGC) or a logarithmic amplifier. The video amplifier is designed so that the minimal signal at the amplifier output has about 2 V peak amplitude. If signal power at the AD output (that is the VA input) is −52 dBm, an appropriate voltage (at a 50Ω load) $V_{SAD}$=0.5 mV and the VA maximal gain should be $G_{VVA}$=4000 or $G_{dBvA}$=72 dB. Since this amplifier has high power consumption it is split into two parts. The first part is a low power consumption amplifier connected to a comparator (Z). Signals detected by the comparator initiate a wake-up signal. Possible high levels of false alarms at this stage are not critical, since the transmitter will not be switched on unless signal detection is confirmed at the main VA output.

Figure 21:
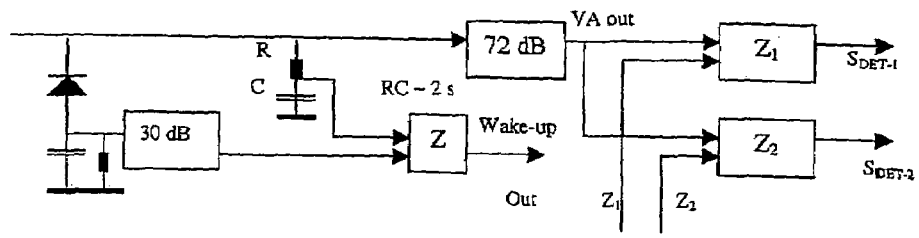
FIG. 21 is a block diagram of a video amplifier subsystem of the transponder of FIG. 18, comprising a low power wake up amplifier and a main amplifier.

The wake-up amplifier has a gain of ~30 dB and the minimal signal level is ~16 mV and narrowband due to utilisation of a peak detector with essential time constant asymmetry in the wake-up channel. A block diagram of the VA for this case is shown in FIG. 21.

A resistor-capacitor (RC) filter with a time constant of 1-2 s averages out the noise floor level. Detected signals are measured relative to this level in order to determine whether all the other transponder subsystems, including the main power supply, should be activated.

The main amplifier is linear with AGC or logarithmic. To evaluate the possible signal dynamic range the maximum possible signal at the transponder input can be calculated. Consider the same equation used to evaluate the minimal signal but with maximal possible parameters: $P_{TR}$=30 kW, the antenna beam 0.7°×30° and the distance $R_{MIN}$=0.2 km.

$$P_{RE} = \frac{P_{TR} G_{TR} G_{RE} \lambda^2}{(4\pi)^2 R^2}$$
$$= \frac{30 \cdot 10^3 \cdot 20 \cdot 1 \cdot (0.03)^2}{(4 \cdot 3.14)^2 \cdot 0.04 \cdot 10^6} \approx 10^{-4} W \text{ or } -10 dBm$$

Thus, the signal dynamic range is −55 dBm to −10 dBm or 45 dB. At the AD input the maximal signal will be ~−3 dBm, at the AD output it will be −7 dBm that is at 50Ω load its amplitude is ~100 mV.

Figure 22:
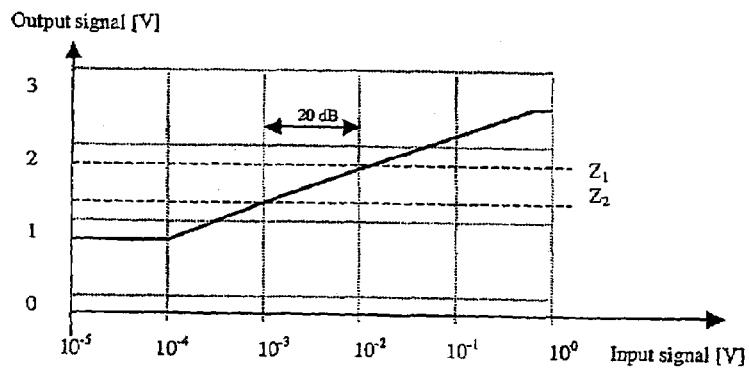
FIG. 22 is a graph of the dynamic range of the main amplifier of FIG. 21.

In this embodiment an off-the-shelf logarithmic amplifier is proposed for main signal amplification This amplifier transforms the linear dynamic range into the log scale (FIG. 22). This amplifier has a 95 dB dynamic range and a rise time of 15 ns.

Figure 23:
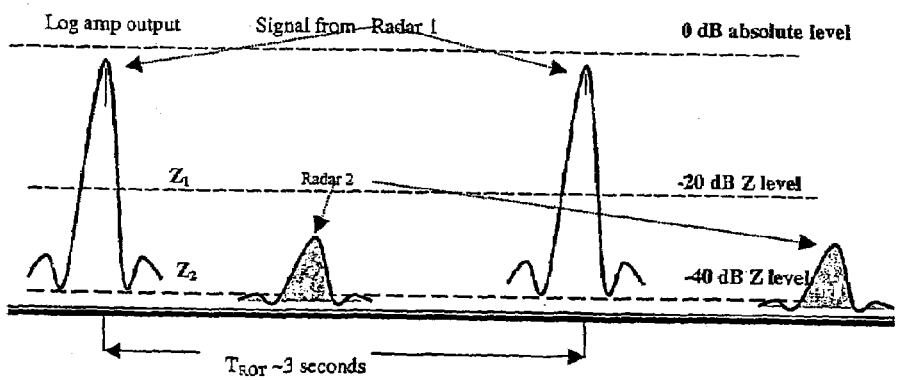
FIG. 23 illustrates the use of detection thresholds to distinguish between two illuminating radar signals of different observed power.

The signal dynamic range at the input of the transponder ~55 dB introduces the problem of where to set the signal detection threshold. The signal level repeats the radar antenna pattern which has −20 dB first sidelobe levels. If a low threshold level is used, then the strong signal (FIG. 23) will be detected not only at the main signal but also at the sidelobes. When a high threshold level is used, the main peak from a weak signal will be missed. This is a problem if the transponder is illuminated by more than one radar. The proposed solution is to use two thresholds $Z_1$ and $Z_2$ separated by ~20 dB. By analysing comparator output signals $S_{DET-1}$ and $S_{DET-2}$ (see FIG. 21) the situation can be resolved at the logic level. For example, analysing one antenna's rotation period a situation can be marked when a signal is detected above both thresholds and, during that period, only the signal from $Z_1$ is analysed.

The discharge time constant should be much smaller than the antenna rotation period but bigger than the pulse train duration (to avoid sidelobe amplification).

Transmitter

Figure 24:
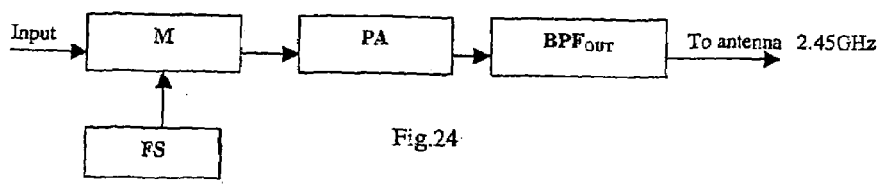
FIG. 24 is a block diagram of a transmitter subsystem of the transponder of FIG. 18, FIGS. 25a and 25b are block diagrams illustrating an M-sequence generator.

At this stage assume that the peak transmitting effective radiating power, that is the product of the transmitting antenna gain and the power itself $P_{PEAK}$ is about 0.5-1 W. When a radar train is detected, the transmitter generates a Binary Phase Shift keying modulation (BPSK) signal with a chip duration of between 0.5 and 1 μs (see below). The maximum train length will correspond to the maximum radar antenna beamwidth (assuming $\theta_{MAX}$=4°, the maximum train duration $T_{MAX}$=0.03 seconds). If the transponder responds to only one radar (which is the typical situation), the average transmitting power is $P_{AV}$=0.01$P_{Peak}$ or 5-10 mW. The transmitter block diagram is shown in FIG. 24, and comprises a frequency synthesiser (FS), a modulator (M), a power amplifier (PA) and an output bandpass filter (BP-$F_{OUT}$).

The frequency synthesizer (FS) is a crystal controlled oscillator and generates one frequency at a time with possible switching with a step of about 2 MHz. The frequency stability is determined by the lowest possible data rate −10 kb/s—or 100 ms symbol duration. During this time, the phase difference between the transmitter and the receiver should not be greater than 45°. The transmitter FS and the receiver FS (described below) share the responsibility for the frequency deviations, hence the transmitter FS provides a possible maximal phase shift of 22.5°/0.1 ms. In a frequency domain this corresponds to $\Delta F_{max}\approx1$ kHz or deviation normalized to the carrier frequency $\Delta F_{max\ N}\approx0.4 \cdot 10^{-3}$. This is an easily achievable figure for the crystal-controlled oscillator. The power amplifier is a non-linear C-class amplifier and the output bandpass filter rejects out of band radiation.

Signal Processing

All signal processing algorithms are performed by a single low power consumption and low cost microprocessor. The major functions of the processor are described with reference to block diagrams 25 and 26 for better visualisation.

Spread Sequences Generation

Figure 25A:
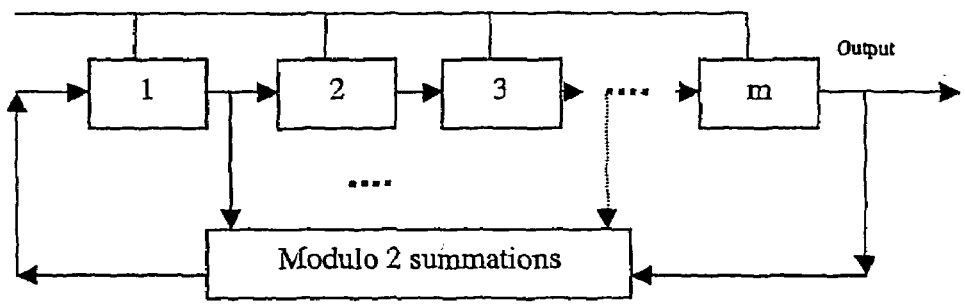
FIG. 25c is a block diagram showing an alternative embodiment of an M-sequence generator
Figure 25B:
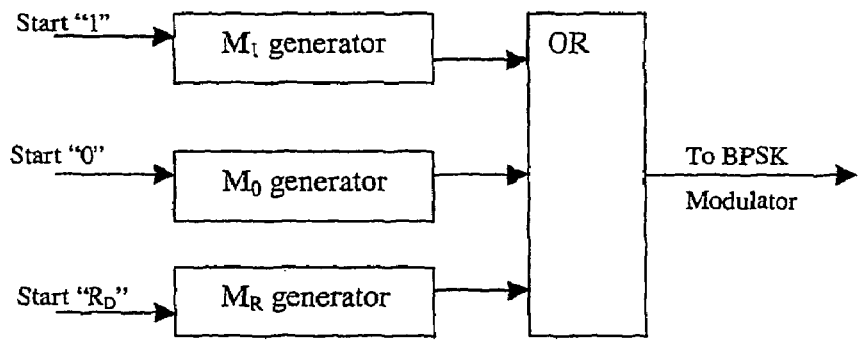
Figure 25:
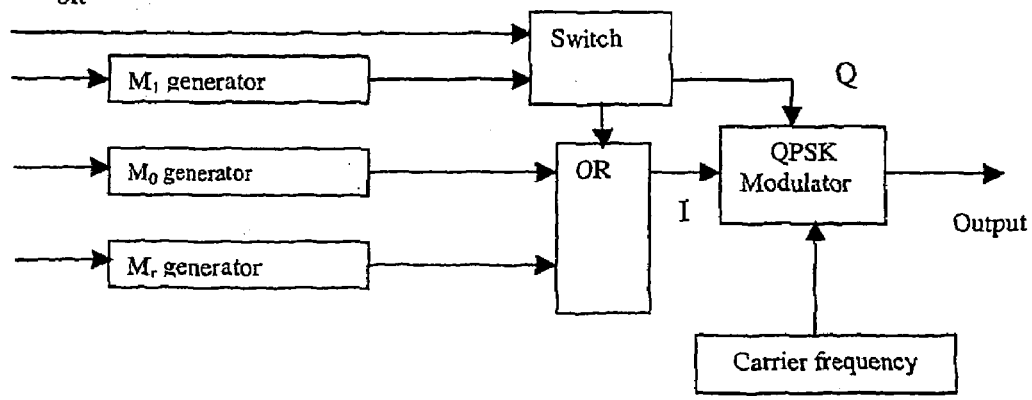

Three M-sequences are used: $M_1$ (M~127) is for encoding logic signal "1", $M_0$ (M~127) is for encoding logic signal "0" and $M_R$ (M~4097) is the sequence used as the source of random signal $R_D$ to transmit during the time intervals $\Delta T_1+\Delta T_2$ (see FIG. 17). So, the transmitting data is an alternation of codes $M_1$ and $M_0$ with chip duration 0.5-1 μs and the processing gain M=127 (as the basis variant). A general M-sequence generator is illustrated schematically in FIG. 25a and the encoding block is shown in FIG. 25b. It is convenient to make the initial conditions at the shift register all "1". So the key of M-sequence generators is a shift register with m bits (M=$2^m$−1) and some feedback with modulo 2 summations.

As was discussed above, it can be useful to apply a specific modulation for one of the transmitting bit, which specifies the real range. This can be done by replacing the binary phase shift modulator (BPSK) by the quadrate phase shift modulator (QPSK). When the data bits are transmitting the quadrature input is blocked. As the result the output signal is BPSK. For the specific bit, both inputs of the QPSK modulator are used: the in-phase input is modulated by the M-sequence which corresponds to the logic '1' and the quadrature input is modulated by the M-sequence which corresponds to the logic '0'. So, '1' and '0' are simultaneously transmitted using sinusoidal and cosinusoidal carrier frequencies. As will be described below, the proposed receiver is not sensitive to the 90° carrier frequency shift (the difference between sin and cos functions). So, at the receiver output will be detected as logic '1' or logic '0' in the case of "normal" data reception; or both logic '1' and logic '0' will be decoded simultaneously for the specific bit that is used for the range measurements (see FIG. 25c).

Timing Diagram Generator

Figure 26:
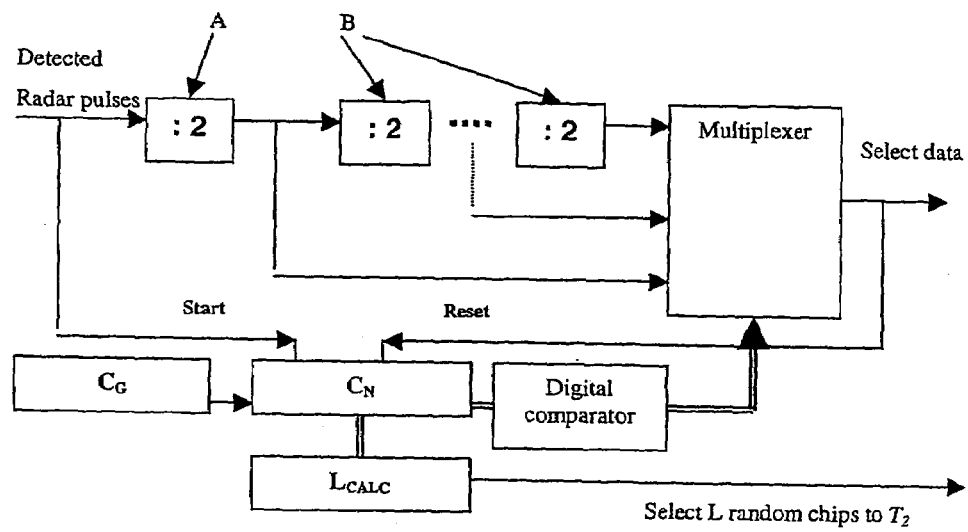
FIG. 26 is a block diagram illustrating calculation of the data cycle.

From the transponder transmitter timing diagram description (see above) it follows that the pulse repetition period at the reception side should be measured to determine the number of divisions required and the number of extra $R_D$ bits to be added during the $T_2$ period of the timing diagram. For timing measurement it is convenient to count pulses from the clock generator ($C_G$) (at say 4 MHz frequencies). The frequency of the counter ($C_N$) will affect the distance accuracy measurement and the period should be << than 0.5 μs. Regardless of the actual $F_{PR}$ of the detected signals, at least one division by 2 (box A) should be carried out to form a rectangular wave shape. Further division (boxes B) depends on the $F_{PR}$ calculation to give a half period closest but bigger than 1 ms (as described above). The procedure is illustrated in FIG. 26. At the end of the $T_1$ half cycle its duration in terms of the number of chips will be known ($L_{CALC}$) and the appropriate number of random data chips can be added before the data bits (chips) in the $T_2$ half cycle.

The Receiver

Figure 27:
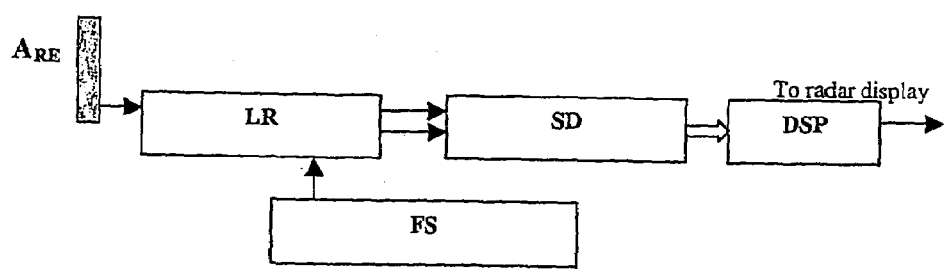
FIG. 27 is a block diagram of a receiver subsystem of the transponder of FIG. 18.

The receiver block diagram is shown in FIG. 27. The receiver antenna is a 6-8 dB standard monopole antenna. The four major functional blocks of the receiver are a linear receiver (LR), a signal detection block (SD), a frequency synthesiser (FS) and a digital signal processor (DSP).

The linear receiver selects the transmitted signal in the frequency domain, gains this signal to an appropriate level and down converts it to in-phase and quadrature (I & Q) channels. The receiver is a typical off the shelf product for any ISM spread spectrum system (~1 MHz bandwidth).

It will be understood that potentially there is a large dynamic range of signal at the receiver input, essentially due to the range in possible distances between the transponder and the receiver. Taking into account that the power of the receiving signal degradation is $4^{th}$ power of distance, the dynamic range could be ~80 dB due to the distance range and ~20 dB due to amplitude fading (assuming a potential maximum distance of 20 km and minimum distance of 200 m). Hence, AGC in the receiver should support this 100 dB possible range of input signals. On the other hand, the method of modulation is a binary one (BPSK) and information at the output of the receiver is binary. 3-bit ADC is used for this data presentation: 1 bit is a sign and two bits represent amplitude variation. Utilization of binary signal presentation in ADC is very attractive, but leads to 2 dB losses in S/N ratio. However, binary digital signal conversion reduces the complexity of a digital matched filter (see below).

The frequency synthesizer has the same requirement as discussed above for the transponder frequency synthesiser.

Figure 28:
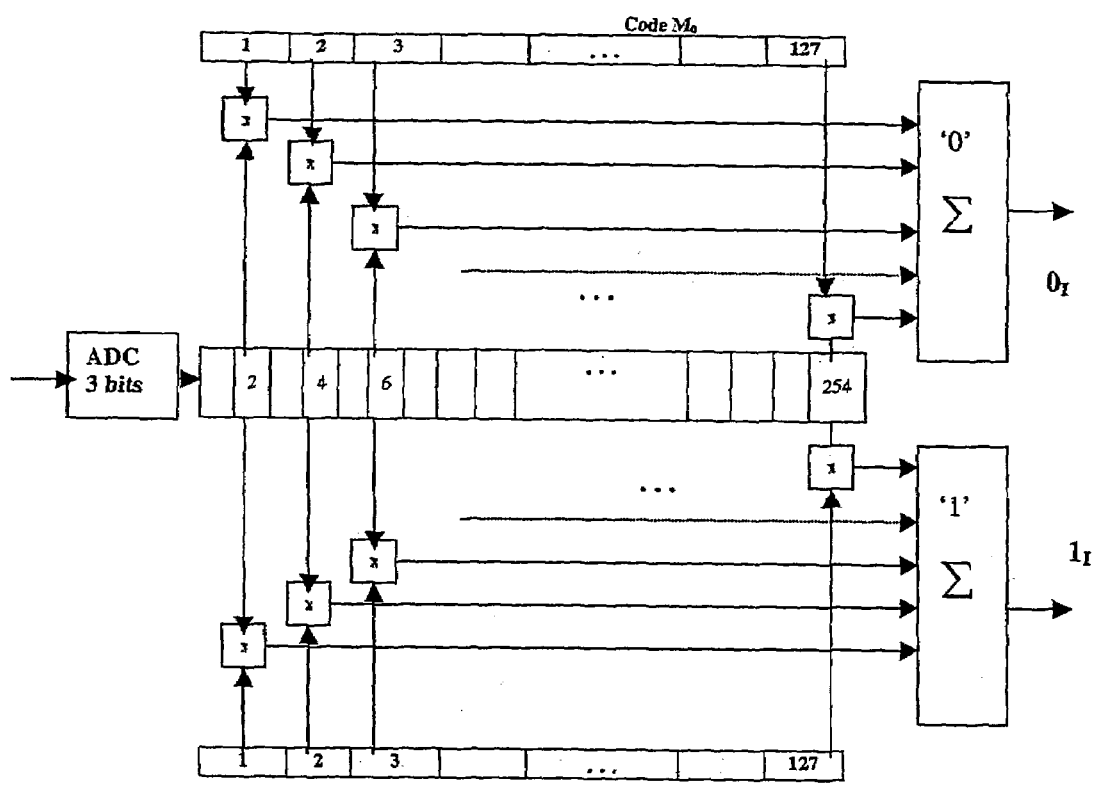
FIG. 28 is a block diagram showing decoding of the data at the signal detection block of the receiver subsystem of FIG. 27.
Figure 29:
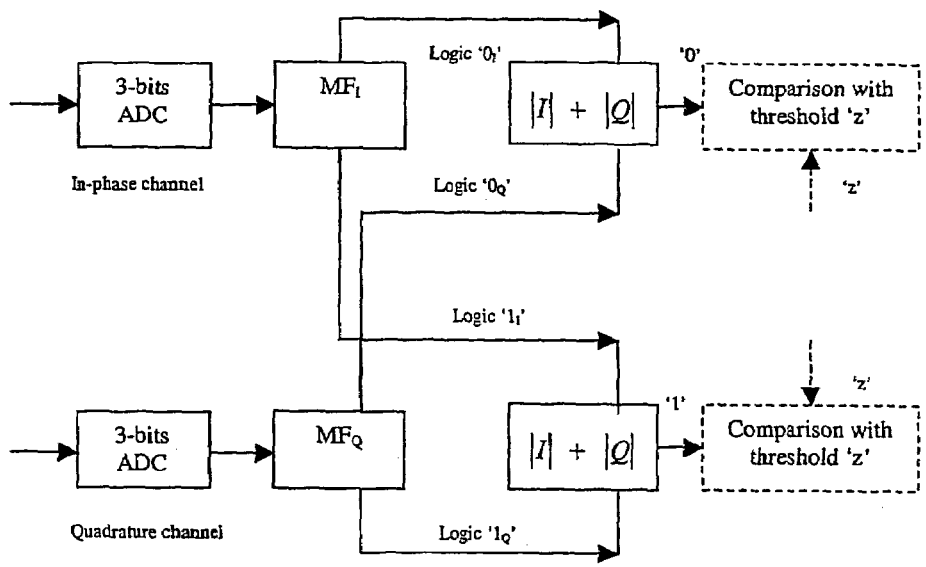
FIG. 29 is a block diagram of the signal detection block of the receiver subsystem of the transponder of FIG. 27.

The procedure of signal detection and decoding are carried out in the signal detection block. The key component of this block is a digital matched filter. The filter block diagram is shown in FIG. 28. The clock signal at the register is half the chip duration and information from this register goes to a multiplexing matrix in the register's stages (2, 4, 6 . . . 254). This is necessary for two reasons—to reduce the sampling error and possible signal/noise losses, as according to sampling theorem it should be two samples per signal chip in the absence of a clock synchronization. Signals from the shift register stages outputs are multiplied with the codes ($M_1$ or $M_0$) with this code presented such that: logic "1" does not change the sign of signal from the shift register, whereas logic "0" does change this sign to the opposite. In the other words $a \times '1' = a$ and $a \times '0' = -a$ The signal at the output of the summator "1" is a cross-correlation between the incoming signal and code corresponding to the data "1" (see $M_1$) and at the output of the summator "0" the signal is matched with the code "0". Hence, the data will be recovered at the filter output, whereas random data transmitting during the $\Delta T_1$ and $\Delta T_2$ intervals will act as noise and will not be recovered. Similar filters are used at the output of the I & Q channels. The connections of the I and Q channel outputs are shown in FIG. 29, $MF_I$ and $MF_Q$ representing matched filters at the I and Q channel outputs respectively.

Thus, when the data is processed by the receiver (FIG. 29) the signal will cross the threshold level z, in the '0' logic channel, when '0' is transmitted and will cross the threshold level z in the '1' logic channel, when '1' is transmitted. When the special bit which carries the range information is received, the signal will cross the threshold level z in both logic '1' and logic '0' channels. So, the reception of '1' and '0' simultaneously is the indicator of the specific bit.

The digital signal processor is a micro-controller with a clock speed of about 10 MHz. This is a multifunctional block with software access. Its functions are to store data from the signal detection block, to select the ranging signal (corresponding to the end of data bit 20), to compare the data with a data-bank and to send control signals. The micro-controller has a standard port for data exchange with a PC computer.

The ranging control signal represents a Morse letter with "dot" duration ~0.25 µs and "dash" duration ~1 µs starting with a "dash" (for clarity on a traditional display. Which particular Morse code is generated depends on the decoded data. The video sequence is TTL compatible.

The DSP block is also responsible for the signal detection. Signal "0" and "1" should be compared in amplitude with a threshold value (z).

Air Interface

Figure 30:
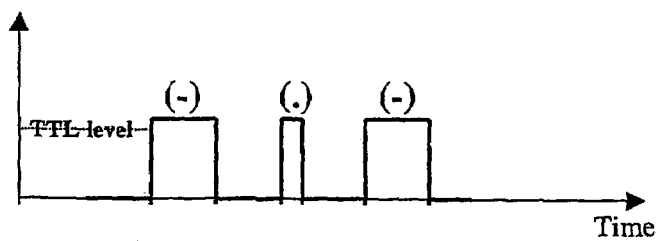
FIG. 30 illustrates a Morse code signal for radar display modulation.
Figure 31:
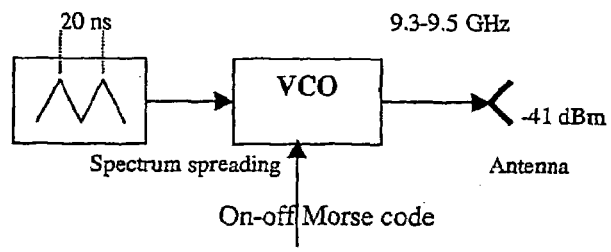
FIG. 31 is a block diagram of an X-band generator for conversion of ISM band signals to X-band for visualisation at a radar display.

To send modulation pulses (FIG. 30) to the radar display could potentially introduce problems. Currently, a large number of different displays are used. Some of the current displays do not have an appropriate input to accommodate the system. To circumvent this problem, a low power very fast scanning (period of scanning 10 ns) oscillator (VCO) is placed directly under or above the radar antenna. The modulation pulses modulate the amplitude of the low power oscillator. Due to this scanning, the output signal will have a noise-like frequency band of 9.3-9.5 GHz (FIG. 31) that is suitable for use with any radar of the class discussed. The output power should correspond to FCC minimal radiation level −500 µV/m (or −41 dBm) at 3 m distance from the antenna. At this power, the radiating signal is strong enough to modulate the radar display.

Thus, it will be understood that installation and operation of the receiver part of the transponder system of the present invention can be quickly and easily retrofitted to any existing X-band radar system by merely securing the voltage controlled oscillator adjacent the radar antenna. No rewiring or other interference with the radar is required and therefore installation does not require electricians or other specialised personnel. During operation, the oscillator can be switched on or off according to the requirements of the operator.

The invention claimed is:

1. A transponder comprising:
    an on-board receiver and associated receiving antenna for receiving incoming radar pulses in a first frequency band at an unknown pulse repetition rate;
    means for calculating the pulse repetition rate
    a frequency synthesiser for generating a signal in a second frequency band;
    modulation means for modulating the signal generated by the frequency synthesiser so as to encode information into the signal; and
    a transmitter and associated transmitting antenna for transmitting said modulated signal,
    wherein the transmitted signal is synchronised with the calculated pulse repetition rate of the incoming radar pulses, and modulation of the transmitted signal is such that accurate positioning of the transponder can be determined at a remote receiver.

2. A transponder as claimed in claim 1, wherein the receiving antenna is omnidirectional in a horizontal plane.

3. A transponder as claimed in claim 1, wherein the second frequency-band of the signal generated by the frequency synthesiser is non-overlapping with the first frequency band.

4. A transponder as claimed in claim 3, wherein the second frequency band is the ISM band.

5. A transponder as claimed in claim 1, wherein the first frequency band is the X band.

6. A transponder as claimed in claim 1, wherein the transponder also comprises at least one amplifier to boost the strength of the transmitted signal.

7. A transponder as claimed in claim 6, wherein a receiving amplifier and a transmitting amplifier are provided.

8. A transponder as claimed in claim 7, wherein the receiving amplifier is in two parts: a low power consumption amplifier which activates all other parts of the transponder when a potential radar pulse is detected, and a higher quality receiving amplifier which is only activated when illumination by a train of radar pulses is confirmed.

9. A transponder as claimed in claim 1, wherein the signal modulation means is spread spectrum modulation means.

10. A transponder as claimed in claim 9, wherein the spread spectrum modulation means spreads the transmitted signal over at least a 1 MHz frequency spectrum.

11. A receiver comprising:
a receiving antenna for receiving modulated signals transmitted from a transponder in accordance with claim 1;
signal processing means for extracting data and positioning information from said signals; and
information output means.

12. A receiver as claimed in claim 11, wherein the information output means is connectable with a printer, computer or a display, such as an X-band radar display, via a cable or other direct connection.

13. A receiver as claimed in claim 11, wherein the receiver includes a frequency synthesiser adapted to generate modulated wideband pulses in a predetermined frequency band, such that when a micro-transmitter provided for this pulse transmission is positioned adjacent the receiving antenna of pulse radar operating within the predetermined frequency, at least positional information is observable at the pulse radar display, thereby obviating the need for a direct connection between the receiver and the display.

14. A receiver as claimed in claim 13, wherein means are provided to enable a radar display operator to select which information is displayed.

15. A position determining system comprising:
a transponder including:
an on-board receiver and associated receiving antenna for receiving incoming radar pulses in a first frequency band at an unknown pulse repetition rate;
means for calculating the pulse repetition rate;
a frequency synthesiser for generating a signal in a second frequency band;
modulation means for modulating the signal generated by the frequency synthesiser so as to encode information into the signal; and
a transmitter and associated transmitting antenna for transmitting said modulated signal;
wherein the transmitted signal is synchronised with the calculated pulse repetition rate of the incoming radar pulses, and modulation of the transmitted signal is such that accurate positioning of the transponder can be determined at a remote receiver; and
a receiver including:
a receiving antenna for receiving modulated signals transmitted from the transponder;
signal processing means for extracting data and positioning information from said signals, and
information output means.

16. A system as claimed in claim 15, wherein the information output means is connectable with a printer, computer or a display, such as an X-band radar display, via a cable or other direct connection.

17. A system as claimed in claim 15, wherein the receiver includes a frequency synthesiser adapted to generate modulated wideband pulses in a predetermined frequency band, such that when a micro-transmitter provided for this pulse transmission is positioned adjacent the receiving antenna of pulse radar operating within the predetermined frequency, at least positional information is observable at the pulse radar display, thereby obviating the need for a direct connection between the receiver and the display.

18. A position determining system as claimed in claim 17, wherein means are provided to enable a radar display operator to select which information is displayed.

19. A position determining system as claimed in claim 15 for use with a pulse radar.

* * * * *